United States Patent Office 3,679,379

Patented July 25, 1972

3,679,379

MAGNETIC COMPOSITIONS

Fumio Okamoto and Yasuo Wada, Tokyo, and Kazuo Miyatani, Kanagawa, Japan, assignors to RCA Corporation, New York, N.Y.

No Drawing. Filed May 19, 1967, Ser. No. 639,647

Int. Cl. C01b *19/00;* H01f *1/00;* H01b *1/06*

U.S. Cl. 23—367 4 Claims

ABSTRACT OF THE DISCLOSURE

A new magnetic semiconductor material comprises the molar formula $CuCr_2Z_3Br$ where Z is sulfur or tellurium. The material is in the spinel crystal class and is useful in magnetic and semiconductor devices. A method of preparing the material comprises first mixing the starting materials, copper bromide, chromium and sulphur or tellurium in the molar ratios of 1:2:3. Then pressed pellets of the mixture are formed and placed in an evacuated quartz tube. The pellets are then fired for about 50 hours at about 800° C.

BACKGROUND OF THE INVENTION

This invention relates to a new magnetic semiconductor material useful in magnetic devices, semiconductor devices and devices requiring the combination of semiconductor and magnetic properties. More particularly, it relates to a magnetic semiconductor material of the spinel type which has a Curie temperature at or near room temperature.

Magnetic semiconducting materials are known in the art. These prior art materials have low Curie temperatures and therefore require sufficient cooling means for maintaining the materials below their Curie temperatures. For example, the compounds gadolinium selenide and yttrium selenide disclosed by S. J. Methfessel et al. in U.S. Patent No. 3,271,709 have Curie temperatures of from about 55° K. to 80° K. The compounds cadmium chromium selenide and cadmium chromium sulfide reported by P. K. Baltzer et al. in Physical Review Letters, volume 15, 493 (1965), have Curie temperatures of 84° K. and 130° K., respectively. Since magnetic materials are non-magnetic above the Curie temperature, it is desirable to obtain materials with as high a Curie temperature as possible. Magnetic materials having higher Curie temperatures than the prior art materials require less cooling. This reduces the requirement for cooling means and may reduce the cost of operating devices employing magnetic semiconductor materials.

SUMMARY OF THE INVENTION

The novel magnetic semiconducting material described herein is characterized in that it has a Curie temperature at or near room temperature. The novel magnetic semiconductor material has the molar formula $CuCr_2Z_3Br$ wherein Z is at least one of the chalcogenides, sulphur or tellurium.

DESCRIPTION OF THE PREFERRED EMBODIMENT

The novel magnetic semiconductor material is a single phase structure of the spinel type. Typically, this material is prepared by reacting a mixture of copper bromide, chromium, and sulphur or tellurium in the molar ratios of 1:2:3 in an evacuated quartz tube at about 800° C. Alternatively, the reactants can be a 1:1 molar ratio mixture of copper bromide and chromium sulfide or chromium telluride. The reactants are mixed together by dry milling for several hours. The milled reactants are then pressed into pellets which are sealed in evacuated quartz tubes. The pellets are then fired for about 50 hours. The quartz tubes can then be cooled and the desired magnetic semiconducting spinel removed therefrom.

Example 1

Magnetic semiconducting $CuCr_2S_3Br$ is prepared by weighing 0.05 mole of CuBr powder, 0.1 mole of Cr metal powder and 0.15 mole of S powder and placing these materials together in a ball mill. The materials are mixed by dry milling for about 18 hours. The mixed powders are then placed in an apparatus for forming pellets from powder samples by pressing. Pellets are pressed from the powder using a pressure of at least about 5,000 p.s.i. These pellets are then placed in quartz tubes which are closed at one end. Usually, there is one pellet per tube. Each quartz tube is then evacuated and sealed at the other end while still evacuated so as to form an ampoule containing the pellet. The ampoule is then placed in a furnace and the temperature of the furnace is slowly (12–15° C./hr.) brought to the firing temperature of about 800° C. The furnace is held at this temperature for about 50 hours and then turned off and allowed to cool to room temperature. The fired pellets produced by this procedure have the empirical formula $CuCr_2S_3Br$ and have a spinel structure with a unit cell parameter of 9.90 A. as determined by X-ray defraction. The Curie temperature of this material is about 264° K.

Example 2

Magnetic semiconducting $CuCr_2Te_3Br$ is prepared by dry milling a mixture containing 0.05 mole of CuBr powder, 0.1 mole of Cr metal powder and 0.15 mole of Te powder for about 18 hours. The milled mixture is then pressed into pellets, sealed in an evacuated quartz ampoule and fired as described in Example 1. The product has a Curie temperature of about 298° K., and a unit cell parameter of 11.11 A.

The table gives the Curie temperature, spontaneous magnetization at 77° K. and the resistivity at room temperature of $CuCr_2S_3Br$ and $CuCr_2Te_3Br$ and

| | $T_c$ (° K.) | Spontaneous Magnetization ($\mu_B$/mole) | Electrical properties and resistivity $\rho$ (ohm-cm.) at room temperature |
|---|---|---|---|
| $CuCr_2S_3Br$ | 264 | 3.1 | Semiconducting $\rho \sim 10^3$. |
| $CrCr_2Te_3Br$ | 298 | 2.5 | fiemiconducting $\rho \sim 10$. |

What is claimed is:

1. A magnetic semiconducting material having the molar formula $CuCr_2Z_3Br$ wherein Z is at least one chalcogenide selected from the group consisting of sulphur and tellurium.

2. The magnetic semiconducting material described in claim 1, wherein Z is sulphur.

3. The magnetic semiconducting material described in claim 1 wherein Z is tellurium.

4. A magnetic semiconducting material having the molar formula $CuCr_2Z_3Br$ wherein Z is a chalcogenide selected from the group consisting of sulfur and tellurium.

No references cited.

OSCAR R. VERTIZ, Primary Examiner

H. S. MILLER, Assistant Examiner

U.S. Cl. X.R.

252—62.3 V, 62.51, 518